United States Patent [19]

Huggins et al.

[11] 4,436,796
[45] Mar. 13, 1984

[54] ALL-SOLID ELECTRODES WITH MIXED CONDUCTOR MATRIX

[75] Inventors: Robert A. Huggins, Stanford, Calif.; Bernard A. Boukamp, Achterste Kamp, Netherlands

[73] Assignee: The United States of America as represented by the United States Department of Energy, Washington, D.C.

[21] Appl. No.: 288,563

[22] Filed: Jul. 30, 1981

[51] Int. Cl.³ .............................................. H01M 4/40
[52] U.S. Cl. ..................................... 429/112; 429/218
[58] Field of Search .............................. 429/112, 218

[56] References Cited

U.S. PATENT DOCUMENTS 4,048,395  9/1977  Lai ....................................... 429/112

OTHER PUBLICATIONS

Boukamp et al., (II), All-Solid Lithium Electrodes with Mixed-Conductor Matrix, Journal of Electrochemical Society, 128 (4), 725 (1981).
Boukamp et al., (III), All-Solid Lithium Electrodes with Mixed-Conductor Matrix, Symposium on Lithium Batteries, Electrochemical Society, Jan. 1981.
Boukamp et al., (IV), All-Solid Lithium Electrodes with Mixed-Conductor Matrix, Journal of Electrochemical Society, vol. 127, No. 8, Aug. 1980, Abstract No. 85.
Boukamp et al., (V), All-Solid Lithium Electrodes with Mixed-Conductor Matrix, Electrochemical Society Extended Abstracts, vol. 80-82, Fall Meeting Hollywood, Florida, Oct. 5-10, 1980.
Boukamp et al., All-Solid Lithium Electrodes with Mixed-Conductor Matrix, J. Electrochemical Soc., Apr. 1981, pp. 725-728.

Primary Examiner—Donald L. Walton
Attorney, Agent, or Firm—Shyamala T. Rajender; Clifton E. Clouse, Jr.; Michael F. Esposito

[57] ABSTRACT

Alkali metal based electrochemical cells offer a great deal of promise for applications in many areas such as electric vehicles and load leveling purposes in stationary power plants. Lithium is an attractive candidate as the electroactive species in such cells since lithium is very electropositive, abundant and light weight. One type of lithium-based cell utilizes a molten salt electrolyte and normally is operated at elevated temperatures. The subject invention provides an electrochemical cell in one embodiment of which lithium is the electroactive species. The cell comprises an electrolyte, a positive electrode, and a negative electrode, either or both of which is an all-solid, composite microstructural electrode containing both a reactant phase and a mixed ionic-electronic conducting phase. The cells of the subject invention exhibit improved kinetic features, current and power densities. Repeated charging and discharging of these cells can be accomplished without appreciable loss of capacity.

26 Claims, 3 Drawing Figures

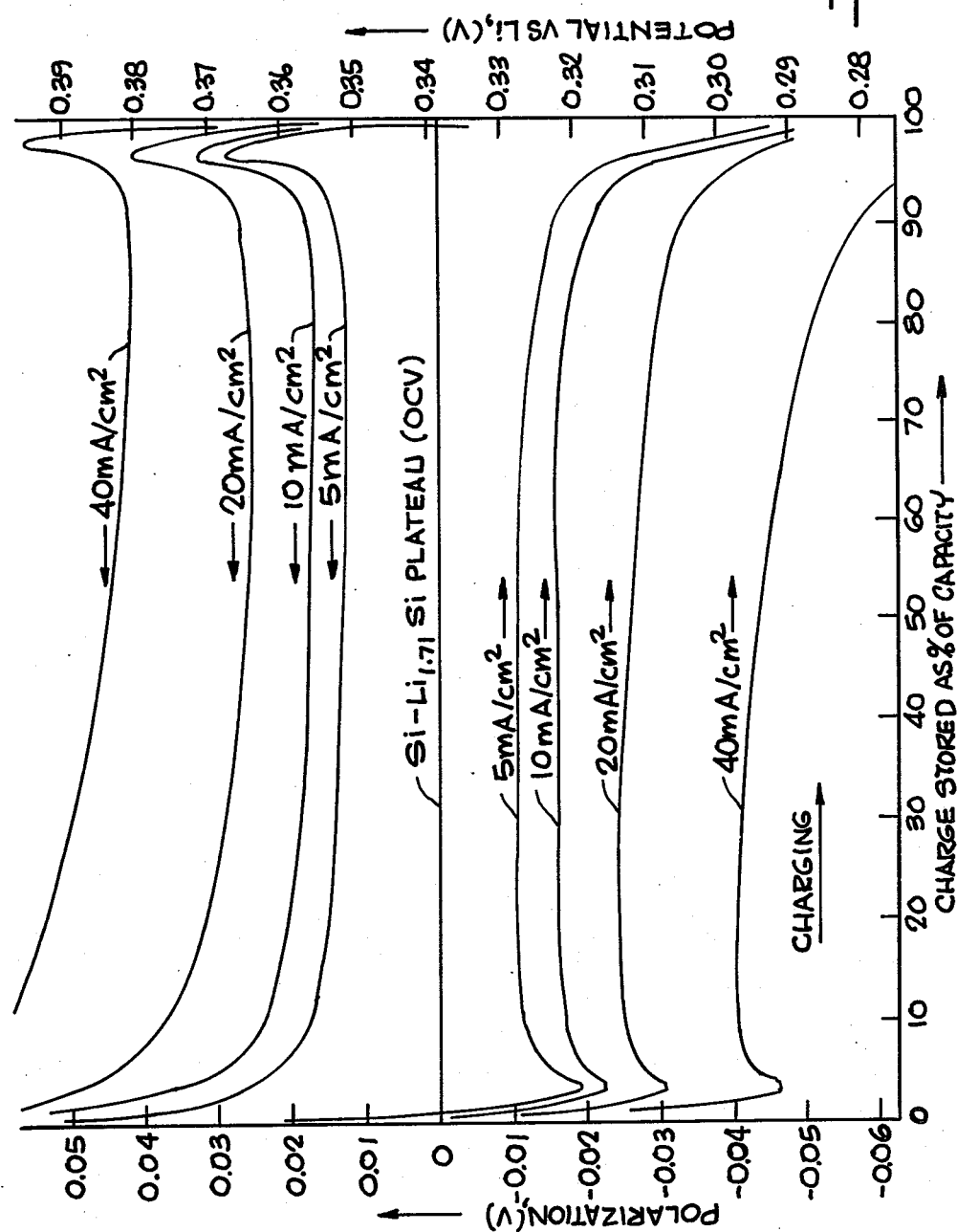

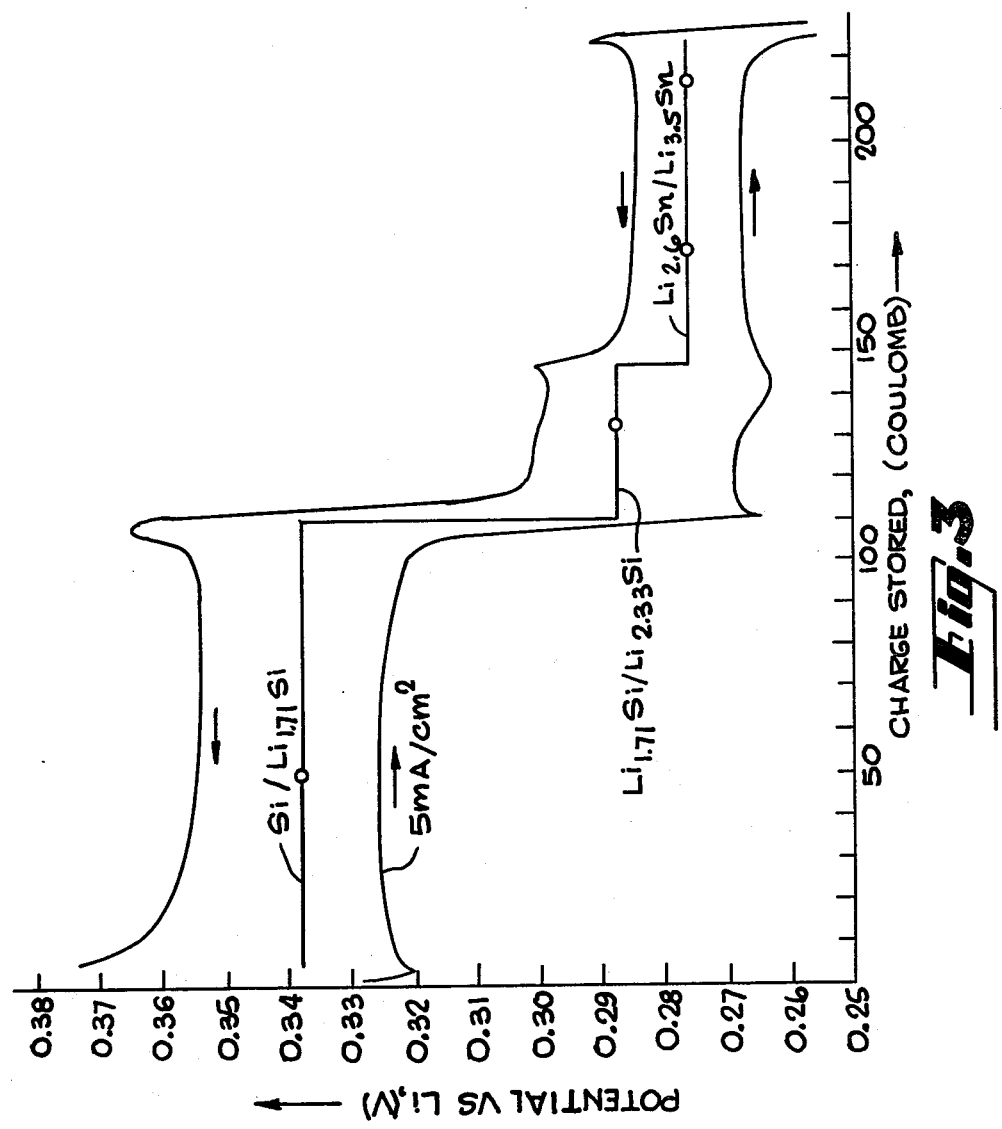

ALL-SOLID ELECTRODES WITH MIXED CONDUCTOR MATRIX

The United States Government has rights in this invention pursuant to subcontract No. S/C 4503110 with Stanford University, under prime contract No. W-7405-ENG-48 between the United States Department of Energy and the University of California.

BACKGROUND OF THE INVENTION

This invention relates generally to electrochemical cells in which a metal or a metal ion is the electroactive species, and more particularly to electrochemical cells including therein novel electrodes of the mixed-conducting matrix type.

There is a great deal of current interest in developing better methods for energy storage. Efficient energy storage is especially important for such applications as electric vehicles and the large scale storage of electrical energy during low demand periods for later use so that the load level of stationary power plants could be more evenly distributed and controlled. Electrochemical cells are particularly attractive for such applications. There has, therefore, been a concerted effort in recent times to develop energy and cost efficient electrochemical cells with improved performance characteristics.

The desirable adaptability of electrochemical cells for various applications stems from the fact that most of the energy associated with spontaneous chemical reactions taking place within these cells, can be converted into utilizable electrical energy by separating the reactive components—the positive and negative electrodes—such that the transfer of electronic charge takes place through an external circuit. The electrolyte allows and maintains the flow of ionic conduction between the two electrodes completes the electric circuit. Of the two classes of cells known, (primary and secondary cells), secondary cells are of particular interest as the associated chemical reactions are reversible by the application of electrical energy. The electrodes of secondary cells for practical applications must, therefore, be able to be regenerated several times during their life time.

Both kinetic and thermodynamic considerations place severe limitations on the performance of all practical electrochemical cells or battery systems. The voltage across any cell is directly related to thermodynamic parameters of the reaction. In order to be stable and reversible in the operational range, electrode potentials have to be within a specified range which is restricted by the properties of the electrolyte of choice. At the same time, the overall electrochemical reaction must occur at a reasonably adequate rate in order to be practical. The development of advanced cells, therefore, depends on the qualities and choice of appropriate materials for the electrodes and for the electrolyte. In addition, the geometric configuration of the electrodes for optimum or desired performance must be established.

One of the current areas of research involves electrochemical cells in which alkali metals or their ions serve as the electroactive species. Major advantages of such batteries include more efficient energy storage, better energy or power to weight or volume ratios and potentially higher voltages compared to conventional batteries. Lithium is a particularly attractive candidate since it is a very electropositive, reasonably abundant, light weight element and is relatively easy to handle. In cells which utilize lithium as the electroactive species, the maximum voltage is obtained if the negative electrode is elemental lithium, but practical considerations such as rechargeability, safety and other factors limit its use in the elemental form. Elemental lithium is unstable in oxidizing environments and liquefied lithium can react violently with the electrolyte or other components normally found in such battery systems. As a result, alloys of lithium are sometimes used instead of elemental lithium in negative electrodes. In one exemplary situation where the negative electrode is an alloy of lithium with aluminum or lithium with silicon, the positive electrode may be a metal sulfide such as iron sulfide and the electrolyte may be a molten salt, such as for example, the eutectic composition of the lithium chloride-potassium chloride system. Due to the high melting point of these salts, such cells are normally operated in the temperature range of about 350° C. to about 500° C.

The use of elemental lithium electrodes in such high temperature lithium/metal sulfide battery systems would present additional, serious problems. It is highly corrosive, difficult to contain, and dissolves in the molten salt electrolyte, causing severe self discharge. These problems can be to a large extent alleviated by using metallic lithium and/or solid lithium-metal alloys; but electrodes made out of such alloys exhibit much slower kinetics than elemental lithium. In order to compensate for this lower kinetics and to provide the requisite current densities, a large surface area for the electrodes becomes a necessity. Such lithium based electrodes which provide a large surface area, are typically made either as a highly porous salt-filled sponge, such as the lithium-aluminum (Li-Al) system, or as a powder contained in a mesh cage, such as the lithium-silicon (Li-Si) system. These lithium-metal alloys are often found to lose their charge-holding capacity with frequent cycling. With the "porous" electrodes of the Li-Al type, their porosity, mechanical and shape instability and manufacturing difficulties pose additional problems. Furthermore, porous electrodes (porous structures permeated by the electrolyte), present the possibility of electrolyte freezing due to high, local charge flux densities and consequent local compositional changes.

SUMMARY OF THE INVENTION

Accordingly, it is an object of the subject invention to provide a rechargeable metal or metal-alloy-based electrochemical cell which has a higher energy or power density than is currently available.

It is another object of the subject invention to provide an electrochemical cell with a better life time and with a larger number of charge-discharge cycles.

It is yet another object of the subject invention to provide electrochemical cells with improved kinetic features i.e., higher current and power densities.

It is a further object of the present invention to provide safer, more effective electrochemical cells including therein electrodes of the solid, composite microstructural type, which efficiently transfers the electroactive species to the reactant species.

It is another object of the subject invention to provide an electrochemical cell with all its component parts, that is cost-effective and more easily manufactured.

Additional objects, advantages and novel features of the invention will be set forth in part in the description which follows, and in part will become apparent to those skilled in the art upon examination of the following description or may be learned by practice of the invention. The objects and advantages of the subject invention may be realized and attained by means of the instrumentalities and combinations particularly pointed out in the appended claims.

To achieve the foregoing and other objects and in accordance with the purpose of the present invention as embodied and broadly described herein, the cell of this invention may comprise an electrolyte, a positive electrode, and a negative electrode, one or both of which may be an all-solid, composite microstructural electrode including both a reactant phase and a mixed ionic-electronic conductor phase. The cell of this invention may also function as a half cell.

An electroactive species of the cell may include a metal or a metal alloy, preferably, metals belonging to Groups IA, IB, IIA and IIB of the periodic table, and more preferably, Gr IA alkali metals, lithium being the most preferred species. The matrix material also includes an electroactive species in combination with another element, preferably a nonmetal, Group IIIA, IVA or a VA element or a compound thereof being the most preferred.

The electrolyte may be any electrolyte used in conventional battery systems, including a salt or a salt mixture, preferably molten salts or salt mixtures and usually includes halide or nitrate moieties. Other anions such as perchlorate, chromate, borate and the like are also suitable.

In a further aspect of the subject invention, the electrode may comprise a mixed conductor matrix phase and a reactant phase, with the reactant phase finely dispersed throughout the matrix phase, the matrix phase determining and maintaining the microstructural morphology of the reactant. The electrode of the present invention may be used as a positive or negative electrode and for current storage in electrochemical cells or half cells.

Accordingly, this invention provides an electrochemical cell with improved kinetic features, life time, and capacity in comparison with prior art cells. In addition, an electrochemical cell in accordance with the present invention can utilize a variety of known electrolyte compositions.

Applications contemplated for the electrochemical cells of the subject invention include electric vehicles and for load leveling purposes in stationary power plants.

BRIEF DESCRIPTION OF THE DRAWINGS

The accompanying drawings, which are incorporated herein and form part of the specification, illustrate the various aspects of an electrochemical cell embodiment of the present invention and, together with the description, serve to explain the principles of the present invention.

In the Drawings:

FIG. 2 is a plot of the electrode polarization as a function of the stored charge.

FIG. 3 represents a plot of the electrode polarization as a function of the stored charge at fixed current during a more complete charge-discharge cycle.

DETAILED DESCRIPTION OF THE INVENTION

Figure 1:
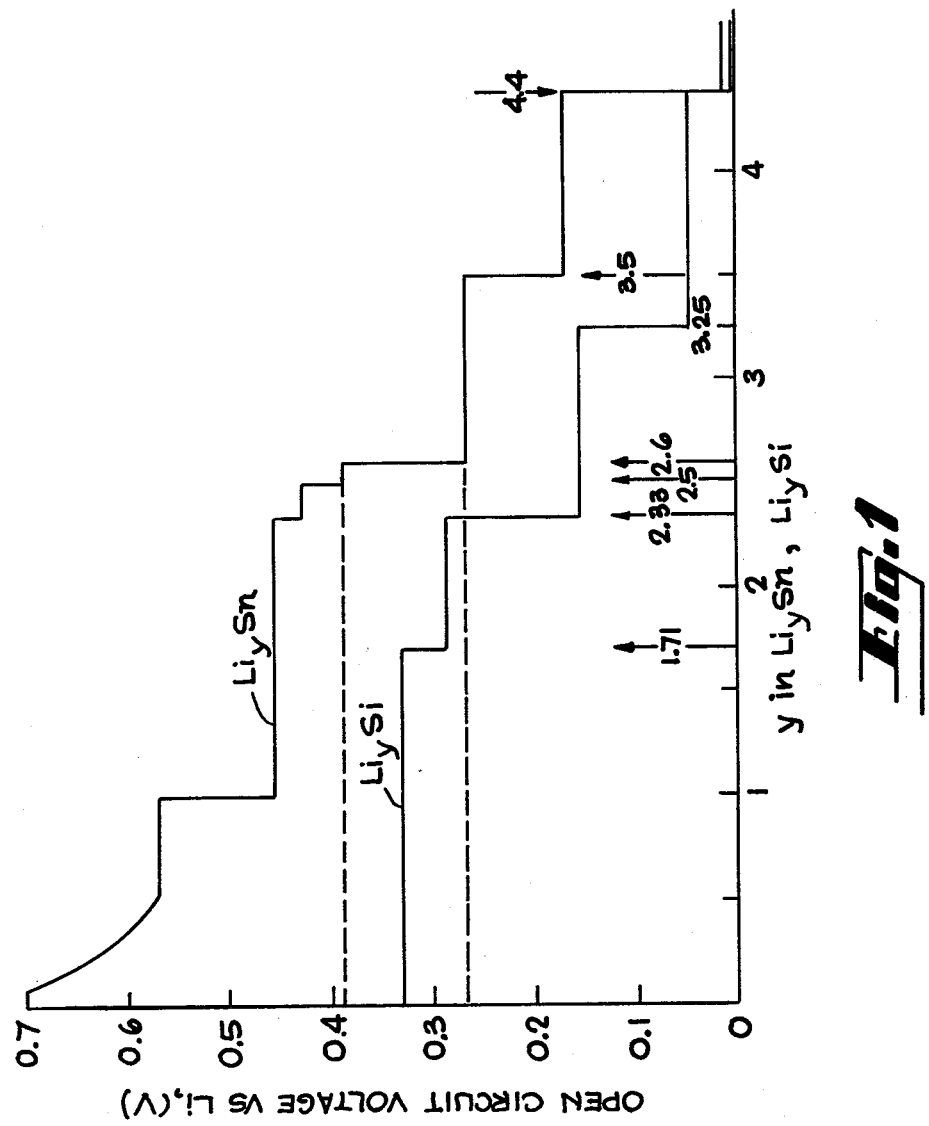
FIG. 1 represents a coulometric titration curve using the electrode of the subject invention in a lithium-based electrochemical cell.

The present invention relates to electrochemical cells including a negative electrode, a positive electrode, and an electrolyte in ionic communication with the electrodes during operation of the cell. More specifically, the subject invention relates to electrochemical cells or half cells which utilize one or more electrodes of the all-solid, composite microstructural type containing both a reactant phase and a mixed ionic-electronic conductor phase i.e., it includes therein materials some of which may be ionic conductors and some, electronic conductors. The electrolyte typically may be a salt or a salt solution, preferably a molten salt, such as a halide, perchlorate, chromate, nitrate or the like of an alkali metal or mixtures thereof. Lithium, sodium, and potassium halides or nitrates are the most preferred species. They may be simple eutectics or more complex compositions. It is also possible to utilize a variety of other species in conjunction with the halide or nitrate compositions mentioned above.

The electroactive species for the subject electrode comprise one or more metals or metal ions, the metals belonging to Groups IA, IB, IIA, and IIB of the periodic chart being preferred. Elements such as sodium, potassium, lead, calcium, magnesium, silver, zinc, protons and the like, are particularly suitable for use as tthe electroactive species. The electroactive species, more preferably, is an alkali metal or an alloy thereof, the most preferred being lithium or a lithium alloy. When the subject electrode is used as a positive electrode, the electroactive species may be an alkali metal, an alkali metal oxide or the like.

The characteristics for the matrix phase include a high diffusion constant for the electroactive species, stability over the operational range of the electrode potential, small stoichiometric changes in the chemical composition of the reactant phase during the charge and discharge cycles and a high electrical conductivity for the electroactive species and for electrons. The chemical diffusion coefficient of the mixed conductor for the electroactive species is chosen to be as high as possible. The preferred matrix material of choice does not react with the reactant species except for the transfer of the electroactive species to the reactant. Typically, the matrix would comprise a combination of one or more metals or alloys of metals, preferably, those belonging to Groups IA, IB, IIA, and IIB, with elements or compounds of elements belonging to Groups IIIA IVA and VA of the periodic table. Elements from other groups, or even anions such as for example, fluoride or chloride, may also be found to be suitable in such combinations.

The reactant phase also comprises an electroactive species which could be the same as that of the matrix phase or different. The reactant material preferably has a high capacity for the electroactive species of choice, and is finely dispersed in the matrix phase so as to produce a large internal surface area. Optimally, the mixed conductor would surround isolated islands of the electrode reactant in such a manner that the reactant is in constant electrochemical contact with the system rather than form isolated pockets as is often observed with porous electrodes.

The electrode of the subject invention can be made from several different combinations of reactants with several matrix materials. When the matrix phase comprises for example, a lithium-tin alloy, the reactant phase may include a lithium-silicon alloy. Other illustrative combinations are lithium-aluminum or lithium-silicon for the reactant phase and lithium-bismuth, lithium-antimony or lithium-tin for the matrix phase. The electrode thus produced has a dense, all-solid structure with good electronic conductivity, mechanical strength and the kinetic properties of a finely dispersed powder. It is to be understood that the electrode may be fabricated in a variety of shapes or configurations, but preferably in a configuration which provides for a relatively large internal surface area. The matrix phase of such an electrode acts simultaneously as the current collector so that no additional material needs to be included therein for that purpose; nor is a metallic sponge necessary to hold the reactant in place as required in the case of some powdered reactants.

While experiments have been performed with different combinations of reactants and matrix compositions, the following experiments with the $Li_ySi/Li_xSn$ system, are presented only for illustrative purposes and are not to be construed to limit in any manner the scope of the invention or of the appended claims.

The matrix, $Li_ySn$, was prepared by direct reaction of lithium (99.9%) and tin (99.9%,) at approximately 400° C. followed by heating to 600° C. for 20–30 minutes. After quenching, the product was broken in a mortar and milled to a fine powder in a ball mill. All handling was done in a helium atmosphere glove box, or in a protective, leak-tight enclosure.

The matrix material was then mixed and ground with Si powder (99.95%,) in a mortar, the silicon/tin (Si/Sn) ratio being about 0.617. The particle size of over 90% of the powder mixture was smaller than 45 microns. Pellets were pressed from this mixture in either a ⅜ inch (0.93 cm) or 5/16 inch (0.794 cm) diameter evacuated steel dies at a pressure of 2700 kg/cm². The pellets were then placed in a molybdenum holder which was tightened around the cylindrical edge of the sample, exposing the flat planeparallel surfaces to the molten electrolyte.

Reference and counter electrodes were prepared in the same manner using an Al/LiAl mixture of nominal overall composition $Li_{0.82}Al$. The three electrode system (LiAl/Al counter and reference electrodes; Li-Sn-Si working electrode) was then placed in the molten LiCl-KCl electrolyte contained in an $Al_2O_3$ crucible in a furnace, the temperature being maintained at approximately 410° C. The electrochemical experiments also were carried out in a helium atmosphere glove box.

Experiments were performed using an Aardvark Model V potentiostat/galvanostat, an Aardvark Model BA-1 buffer amplifier and a Model 379 P. A. R. digital coulometer. Voltages were measured using a Keithley digital multimeter and a stripchart recorder. Experiments were either performed potentiostatically or galvanostatically.

The first few charging (adding lithium to the reactant) and discharging (removing lithium from the reactant) cycles were performed potentiostatically, the charging potential being set at 0.300 V with respect to Li and the discharging potential at 0.375 V with respect to Li. The current was integrated by a coulometer and recorded on a stripchart recorder. During the course of the experiment, potentiostatic cycles were run in order to monitor the coulombic capacity. It was found that it remained virtually constant over the duration of the experiments (16–20 cycles, one charge and discharge being counted as one cycle) indicating negligible capacity loss on cycling.

Experiments were also done to determine the lithium capacity of the reactant. A number of phases are known to exist in the Li-Sn system all of which exhibit high chemical diffusion for Li. The $Li_{2.6}Sn$ phase shows the highest diffusion coefficient, which increases with increasing Li activity.

Similarly, the Li-Si system also exhibits several phases. Measurements were made on the subject electrode systems to demonstrate the stability ranges of these phases with respect to the lithium activity and the two-phase voltage plateaus of the reactant phase, thereby to determine the optimum operational combination for the compositions of the two species, the matrix and the reactant.

The starting composition of the matrix was $Li_{1.56}Sn$. Lithium was added electrochemically to the sample until its potential reached 0.350 V with respect to elemental lithium. At this point virtually no lithium was found to have been incorporated in the single-phase Si reactant. The matrix then went through two phases, $Li_{2.33}Sn$ and $Li_{2.5}Sn$, before arriving at the equilibrium composition of $Li_{2.6}Sn$. THe positions of all Li-Sn phases and two-phase voltage plateaus as also those for the reactant species $Li_ySi$ are shown in FIG. 1. Compatible compositions for the reactant and matrix phases can be obtained by choosing the voltage plateaus of the reactant phase which are positioned approximately in the middle of the stability range or ranges of the matrix phase. From FIG. 1 it can be seen that the $Si-Li_{1.71}Si$ two-phase plateau voltage is positioned near the middle of the stability range of the matrix phase $Li_{2.6}Sn$. Other similar compatible combinations may be obtained from FIG. 1.

A number of cycles were run galvanostatically in order to establish the polarization characteristics of the mixed conducting matrix electrodes of the subject invention. The configuration or the placement of the electrodes relative to each other was found not to be a crucial factor. A simple triangular arrangement was therefore used. In order to start from the same composition, or lithium activity, the electrodes were equilibrated potentiostatically at 0.375 V with respect to lithium before charge, and at 0.300 V before discharge.

When the matrix electrode was charged with more lithium, the potential fell to that of the next two-phase plateau where $Li_{2.33}Si$ begins to form. The matrix could also enter a two-phase region with the formation of $Li_{3.5}Sn$ at about the same potential. FIG. 2 shows a plot of the electrode polarization as a function of the state of charge at several current densities indicated on the diagram. It may be observed that the subject electrode has a capacity for and is stable at high current densities.

FIG. 3 shows a complete galvanostatic cycle, measured at a current density of 5 mA/cm² in which the two additional plateaus can be observed. From the length of these plateaus it could be concluded that the first additional plateau is the $Li_{1.71}Si/Li_{2.33}Si$ two-phase region, as its length is approximately 0.3 times the length of the first. i.e., $Si-Li_{1.7}Si$ plateau. The second additional plateau similarly could be associated with the $Li_{2.6}Sn/Li_{3.5}Sn$ two-phase region. Its length is equivalent to about 0.9 times the amount of tin in the sample.

This type of extended charging and subsequent discharging cycles did not seem to affect the integrity of the sample, or the overall kinetic behaviour of the electrode. The coulombic capacity of the first plateau reamined virtually unchanged.

The subject invention thus offers several advantages over prior art electrodes. It provides an electrode which has a large internal surface area and is also suitable for use in high temperature batteries, particularly in high temperature lithium batteries. The microstructural electrode of the subject invention is a good conductor and has a high diffusion coefficient for the electroactive species. The electrode of the subject invention is stable over the range of potential at which the reactant is operated. The matrix phase which determines and maintains the microstructural morphology of the reactant also acts as a current collector and a fast transport medium. The reactant acts as the charge storage system. This type of electrode obviates problems associated with densification and particle growth which decrease the useful capacity of prior art liquid-permeated electrode structures.

The above embodiment was chosen and described in order to explain best the principles and the practical application of the subject invention thereby to enable those skilled in the art to utilize the invention in various other embodiments and various modifications as are suitable for the particular use contemplated. The foregoing description of one preferred embodiment of the invention, therefore, has been presented only for purposes of description and illustration of the subject invention. It is not intended to be exhaustive or to limit the invention to the precise form disclosed, and many modifications and variations would become obvious to those skilled in the art from the teachings and disclosure herein. It is intended that the scope pf the invention is best defined by the appended claims.

What is claimed is:

1. An electrochemical cell comprising:
   a positive electrode, a negative electrode, and an electrolyte,
   said positive or negative electrode having an all-solid, composite microinstructural morphology and including therein both a reactant phase and a mixed-conducting matrix phase.

2. An electrochemical cell as in claim 1, wherein the electroactive species includes a metal or an alloy thereof.

3. An electrochemical cell as in claim 2, wherein said metal or one metal of said metal alloy is an alkali metal.

4. An electrochemical cell as in claim 3, wherein said metal alloy is lithium-silicon alloy or lithium-aluminum alloy.

5. An electrochemical cell as in claim 1, wherein said matrix phase includes at least one metal or metal alloy.

6. An electrochemical cell as in claim 5, wherein said metal or one metal of said metal alloy is an alkali metal.

7. An electrochemical cell as in claim 6, wherein said metal alloy is chosen from a group consisting of lithium-tin, lithium-bismuth and lithium-antimony alloys.

8. An electrochemical cell as in claim 1, wherein both said reactant phase and said conductor phase include a metal or a metal alloy.

9. An electrochemical cell as in claim 8, wherein said metal or metal alloy includes as the electroactive species a metal chosen from the group consisting of lithium, sodium, potassium, calcium, lead, magnesium, silver and zinc.

10. An electrochemical cell as in claim 1, wherein the electrolyte includes one or more metal salts.

11. An electrochemical cell as in claim 10, wherein said metal salts include alkali metal halides or nitrates.

12. An all-solid composite microstructural electrode for electrochemical cells, having both a reactant phase and a mixed conducting phase comprising:
   a reactant species; and
   a mixed ionic-electronic conducting matrix;
   said reactant species being finely dispersed in said matrix to form a composite; and
   said composite determining and maintaining the microstructural morphology of said reactant phase.

13. An electrode as in claim 12, wherein said reactant species includes a metal or a metal alloy.

14. An electrode as in claim 13, wherein said alloy is lithium-silicon or lithium-aluminum alloy.

15. An electrode as in claim 13 or claim 14, wherein said metal or metal alloy is finely powdered and uniformly dispersed in said matrix.

16. An electrode as in claim 15, wherein said matrix includes a metal or metal alloy.

17. An electrode as in claim 16, wherein said metal or at least one metal of said metal alloy is selected from a group consisting of lithium, potassium, sodium, silver, magnesium, zinc, calcium and lead.

18. An electrode as in claim 16 or claim 17, wherein said metal alloy is chosen from a group consisting of lithium-antimony, lithium-bismuth and lithium-tin.

19. In an electrochemical cell including lithium as the electroactive species thereof, said cell having a positive electrode, a negative electrode, and an electrolyte, the improvement comprising:
   said positive or negative electrode having an all-solid composite microstructural morphology and including therein a reactant phase and a mixed-conducting matrix phase,
   said matrix phase determining and maintaining the microstructural morphology of said reactant phase.

20. An electrochemical cell as in claim 19, wherein said electrolyte includes one or more metal salts.

21. An electrochemical cell as in claim 19 or claim 20, wherein said metal salts include alkali metal haldies or nitrates.

22. An electrochemical cell as in claim 19, wherein said reactant species includes a metal or metal alloy.

23. An electrochemical cell as in claim 22, wherein said metal alloy is lithium-silicon or lithium-aluminum alloy.

24. An electrochemical cell as in claim 19, wherein said matrix phase includes at least one metal or metal alloy.

25. An electrochemical cell as in claim 24, wherein said metal or metal alloy includes lithium as the electroactive species.

26. An electrochemical cell as in claim 25, wherein said metal alloy is chosen from a group consisting of lithium-tin, lithium-bismuth and lithium-antimony alloys.

* * * * *